(12) United States Patent
Prasad et al.

(10) Patent No.: US 10,320,539 B2
(45) Date of Patent: Jun. 11, 2019

(54) METHODS AND APPARATUSES FOR REFERENCE SIGNAL ADAPTATION BASED ON INCOMING USER MOBILITY INFORMATION

(71) Applicant: NOKIA TECHNOLOGIES OY, Espoo (FI)

(72) Inventors: Athul Prasad, Helsinki (FI); Ankit Bhamri, Espoo (FI); Petteri Lunden, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/161,669

(22) Filed: May 23, 2016

(65) Prior Publication Data

US 2017/0338923 A1 Nov. 23, 2017

(51) Int. Cl.
| | | |
|---|---|---|
| H04W 4/00 | (2018.01) | |
| H04L 5/00 | (2006.01) | |
| H04W 8/02 | (2009.01) | |
| H04W 36/00 | (2009.01) | |
| H04W 36/30 | (2009.01) | |
| H04W 92/20 | (2009.01) | |

(52) U.S. Cl.
CPC .......... *H04L 5/0048* (2013.01); *H04L 5/0023* (2013.01); *H04L 5/0078* (2013.01); *H04L 5/0091* (2013.01); *H04W 8/02* (2013.01); *H04W 36/0055* (2013.01); *H04W 36/0083* (2013.01); *H04W 36/30* (2013.01); *H04L 5/001* (2013.01); *H04L 5/0035* (2013.01); *H04W 92/20* (2013.01)

(58) Field of Classification Search
CPC .. H04L 5/0048; H04W 8/02; H04W 36/0083; H04W 36/30
USPC .......................................................... 370/331
See application file for complete search history.

(56) References Cited

U.S. PATENT DOCUMENTS

| | | | |
|---|---|---|---|
| 8,805,370 B1 * | 8/2014 | Kannan ................... | H04L 12/66 370/254 |
| 10,063,357 B2 | 8/2018 | Kim et al. | |
| 2012/0157103 A1 * | 6/2012 | Frenger ............. | H04W 36/0055 455/437 |

(Continued)

FOREIGN PATENT DOCUMENTS

| | | |
|---|---|---|
| JP | 2015528652 A | 9/2015 |
| JP | 2017508316 A | 3/2017 |

(Continued)

OTHER PUBLICATIONS

European Search Report application No. 17171216.9 dated Jul. 7, 2017.

(Continued)

*Primary Examiner* — Mang Hang Yeung
(74) *Attorney, Agent, or Firm* — Squire Patton Boggs (US) LLP

(57) ABSTRACT

Systems, methods, apparatuses, and computer program products for reference signal adaptation based on incoming user mobility information are provided. One method includes receiving, by a target base station, a request to begin transmitting reference signals for mobility measurements. The request may be received from a source base station serving a user equipment. In addition, the request may be received when a handover of the user equipment is impending.

19 Claims, 9 Drawing Sheets

(56) References Cited

U.S. PATENT DOCUMENTS

| | | | |
|---|---|---|---|
| 2014/0307644 A1 | 10/2014 | Kwong | |
| 2014/0334390 A1* | 11/2014 | Lindholm | H04L 5/0007 370/329 |
| 2015/0023197 A1 | 1/2015 | Iraji | |
| 2015/0155993 A1 | 6/2015 | Berggren et al. | |
| 2015/0257073 A1* | 9/2015 | Park | H04B 7/0408 370/331 |
| 2015/0312010 A1* | 10/2015 | Urabayashi | H04W 48/12 370/329 |
| 2016/0211959 A1* | 7/2016 | Jongren | H04L 5/0051 |

FOREIGN PATENT DOCUMENTS

| | | |
|---|---|---|
| WO | 2007106000 A1 | 9/2007 |
| WO | 2010/128909 A1 | 11/2010 |
| WO | 2013029004 A1 | 2/2013 |
| WO | 2013/113988 A1 | 8/2013 |
| WO | 2014023361 A1 | 2/2014 |
| WO | 2014/168574 A1 | 10/2014 |
| WO | 2015093866 A1 | 6/2015 |

OTHER PUBLICATIONS

Ericsson, "Mobility execution in NR, 3GPP TSG-RAN WG2 #94 R2-164000", China, May 23-27, 2016. pp. 1-2.

LG Electronics, DM-RS Design for Dual-layer Beam-forming, 3GPP TSG-RAN WG1 #58 R1-093233, China, Aug. 24-28, 2009. pp. 1-6.

Japanese Office Action and it's English Language Translation dated Aug. 8, 2018, issued in corresponding JP Application No. 2017-097842.

* cited by examiner

METHODS AND APPARATUSES FOR REFERENCE SIGNAL ADAPTATION BASED ON INCOMING USER MOBILITY INFORMATION

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), and/or 5G radio access technology. Some embodiments may generally relate to lean carrier design and mobility state estimation.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency.

SUMMARY

One embodiment is directed to a method, which may include receiving, by a target base station, a request to begin transmitting reference signals for mobility measurements, the request being received from a source base station serving a user equipment. The method may also include, in response to the request, deciding whether or not to transmit the reference signals for mobility measurements.

Another embodiment is directed to an apparatus, which may include at least one processor and at least one memory including computer program code. The at least one memory and computer program code may be configured, with the at least one processor, to cause the apparatus at least to receive a request to begin transmitting reference signals for mobility measurements, the request being received from a source base station serving a user equipment. In response to the request, the at least one memory and computer program code may be further configured, with the at least one processor, to cause the apparatus at least to decide whether or not to transmit the reference signals for mobility measurements.

Another embodiment is directed to an apparatus, which may include receiving means for receiving a request to begin transmitting reference signals for mobility measurements, the request being received from a source base station serving a user equipment. The apparatus may also include, in response to the request, deciding means for deciding whether or not to transmit the reference signals for mobility measurements.

Another embodiment is directed to a method, which may include determining, by a source base station, that a target base station should be informed about a need for reference signals for mobility measurements. The method may also include sending a request, from the source base station serving a user equipment, to the target base station to begin transmitting reference signals for mobility measurements.

Another embodiment is directed to an apparatus, which may include at least one processor and at least one memory including computer program code. The at least one memory and computer program code are configured, with the at least one processor, to cause the apparatus at least to determine that a target base station should be informed about a need for reference signals for mobility measurements, and send a request to the target base station to begin transmitting reference signals for mobility measurements. In an embodiment, the apparatus comprises a source base station serving a user equipment.

Another embodiment is directed to an apparatus, which may include determining means for determining that a target base station should be informed about a need for reference signals for mobility measurements. The apparatus may also include sending means for sending a request to the target base station to begin transmitting reference signals for mobility measurements.

BRIEF DESCRIPTION OF THE DRAWINGS

For proper understanding of the invention, reference should be made to the accompanying drawings, wherein:

FIG. 7a illustrates an example case where reference signals are transmitted on every transmission time interval (TTI);

FIG. 7b illustrates an example case where reference signals are not transmitted on every transmission time interval (TTI);

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for reference signal adaptation based on incoming user mobility information, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Figure 1:
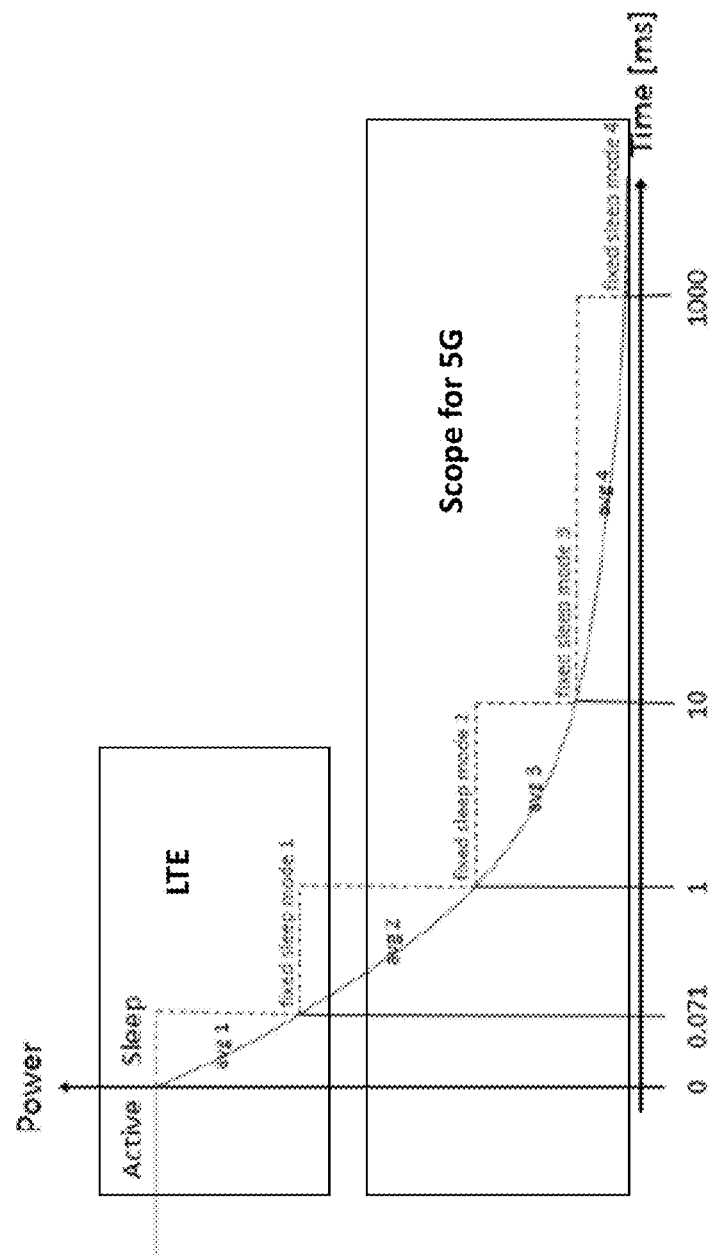
FIG. 1 illustrates the potential for power savings in LTE/4G as compared to 5G.

One of the key design paradigms in $5^{th}$ generation (5G) networks is to have lean carrier design with optimized always-on signaling, which is essential in achieving the challenging energy saving targets currently set for 5G networks. An objective is to have fully configurable design for reference signals and, through broadcast signalling, indicate to the UE the positioning of reference signals, which can then be measured by the UEs. This would help in overcoming the key limitation of having to send reference signals with a fixed periodicity for 5G node Bs (5G-NBs) trying to enter the energy saving mode, and have longer discontinuous transmission (DTX) durations, by adapting the reference signal formats. If all the UEs connected to a 5G-NB are immobile and subscribing to extreme mobile broadband service flows, then the network could also avoid sending cell-specific reference signals, synchronization signals, etc. Extreme mobile broadband service flows have a 1000 times higher data rate demand as compared to LTE/4G. This would enable the saving of valuable radio resources and enhance the spectral efficiency and capacity of the system. The potential for power savings in LTE/4G as compared to 5G is illustrated in FIG. 1, based on base transceiver station (BTS) power model. The higher savings depicted in FIG. 1 are due to the longer sleep modes that are possible (due to the lack of need for sending cell-specific reference signals (CRS) with a fixed periodicity).

Figure 2:
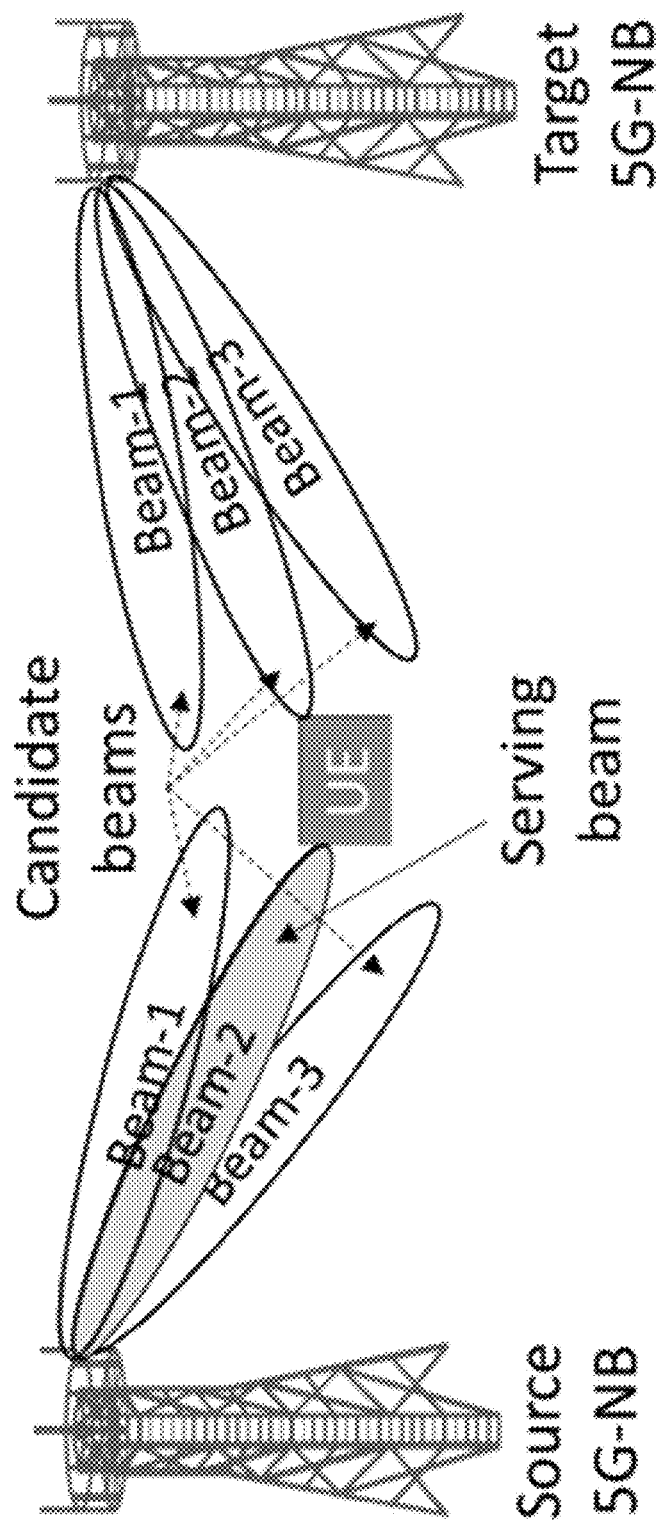
FIG. 2 illustrates a system diagram depicting an example scenario where the UE is served using a directional beam from a target 5G-NB and having different potential candidate beams in the target 5G-NB.

Apart from energy savings, one of the key use cases of flexible reference signal format is the ability for the 5G-NB to tailor the transmissions in a radio access network (RAN) depending on the target use cases envisioned by the network operator. For example, if the network is optimized for a high throughput/extreme mobile broadband use case, for static users, then the amount of reference signals can be minimized so that the spectral efficiency for data communication increases and all the radio resources are optimally utilized. If the use case is ultra-reliability, then the amount of reference signals can be optimized for accurate measurement of the channel conditions by the UE, so that the probability of packet loss, etc., can be minimized. FIG. 2 illustrates an example scenario where the UE is served using a directional beam from a target 5G-NB and having different potential candidate beams in the target 5G-NB. As depicted in FIG. 2, the 5G-NB is aware of the candidate beams through the measurement reports from the UE consisting of the beam IDs and cell IDs (which is similar to the physical cell ID (PCI) in LTE).

While there is a consensus within the industry to have the lean carrier design for 5G, how the scheme could be implemented, especially in the context of mobility has received limited attention so far. Adapting the always-on signals, such as common reference signals, depending on the service flows and service types would have impacts in terms of the discoverability of the 5G cell. For instance, if the reference signals are too sparse, then idle and connected mode UEs would have difficulties in discovering the cell; whereas, if it were too dense, it would lead to suboptimal resource utilization and limit the opportunities for energy savings. Currently, there are no methods that specifically address this problem of optimizing mobility along with the lean carrier design, especially taking into account the beam-specific variability aspects.

Thus, an embodiment of the invention is directed to a method that uses the lean carrier design for reference signal (RS) adaptation based on an impending handover, on a candidate set of beams serving the UE at the source cell. One embodiment may further utilize the mobility state information or other UE speed information to configure the reference signal periodicity. For example, this may be done on the served beam (or candidate set of beams) in the source cell, as well as configuring such information in the potential beam (or candidate set of beams) in the target cell. It is noted that the reference signal periodicity refers to the frequency in transmission time intervals when the reference signals are sent.

Certain embodiments may further include defining the reference signal density decision metric based on established bearers. For instance, for service flows serving high reliability traffic, one embodiment may increase the reference signal density in the (candidate set of) beams in the target 5G-NB, thereby reducing the probability of handover failures. This could be done on top of the mobility related considerations. In addition, an embodiment may optimize the density depending on mobility state alone for default service flows, for example, serving best-effort traffic. Here, the density could be reduced for slow moving UEs and increased for fast-moving UEs. For performing optimized load balancing, if the target 5G-NB does not want to admit new users, an embodiment may reject the RS modification request from the source 5G-NB, such that neighbour UEs do not detect the target 5G-NB. It is noted that the reference signal density indicates the amount of reference signals within a transmission time interval (TTI). This provides a 5G-NB the option to have different reference signal pattern within a TTI.

Figure 3:
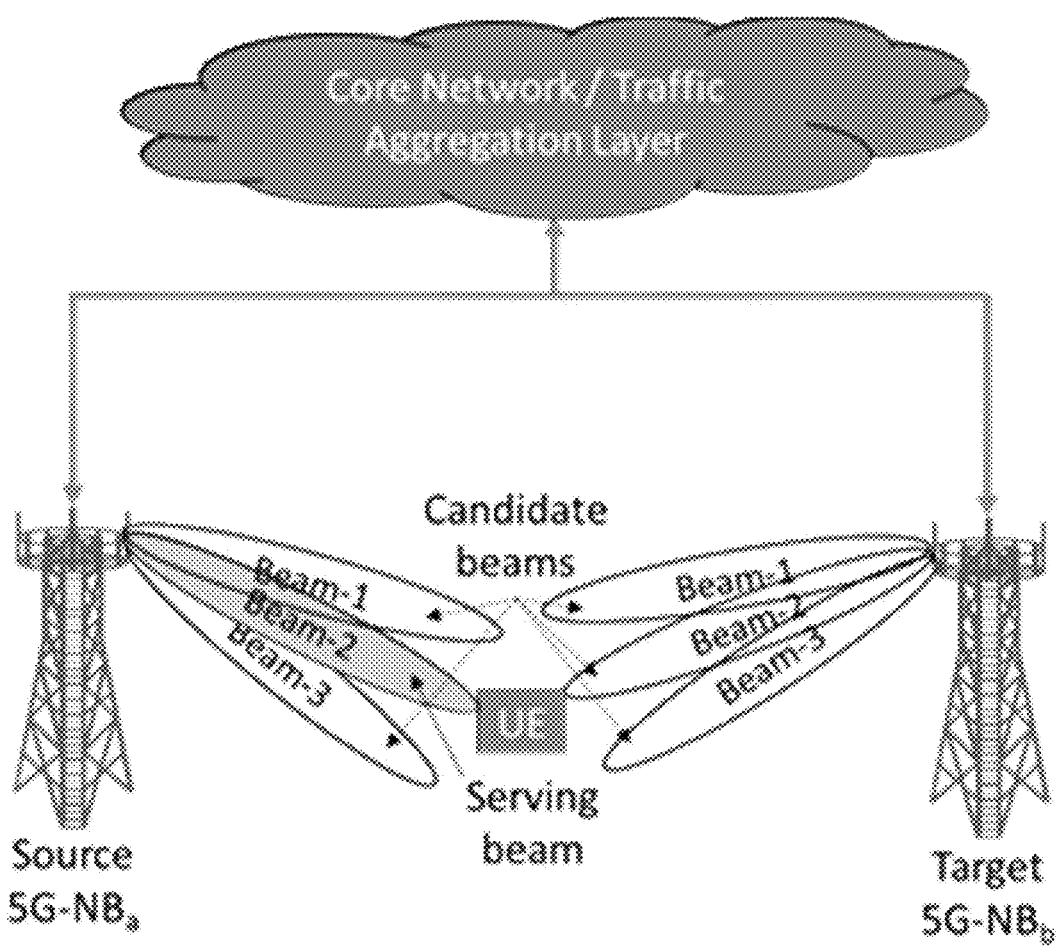
FIG. 3 illustrates an example diagram of a system including a UE, source 5G-NB and target 5G-NB with multiple candidate beams, according to one embodiment.

FIG. 3 illustrates an example diagram of a system including a UE, source 5G-NB and target 5G-NB with multiple candidate beams, according to one embodiment. In the example of FIG. 3, the UE is served by Beam-2 from 5G-NB$_a$, with a candidate set of beams which would be: for 5G-NB$_a$, Beam-1,3; for 5G-NB$_b$, Beam-1,2,3. The candidate set of beams would be essential in recovering from radio link failures occurring on the serving beam, which is highly probable in the higher frequency bands considered for 5G. It is assumed that there exists a layer above the 5G-NB, which can aggregate and re-route traffic between the various 5G-NBs on a fast timescale. This is required to overcome the link layer uncertainties, while providing low-latency and high reliability.

Figure 4:
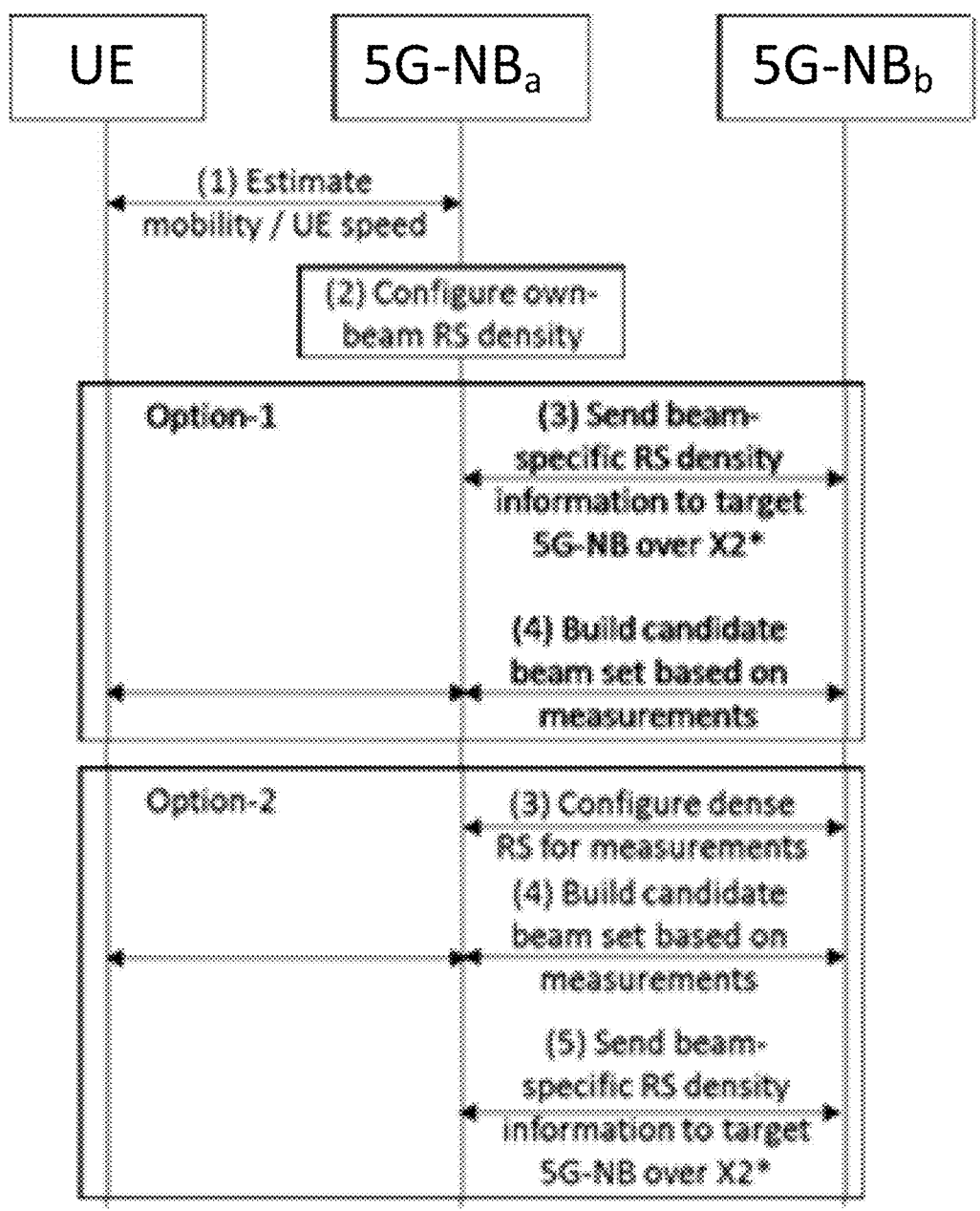
FIG. 4 illustrates an example signaling diagram for reference signal coordination, according to an embodiment.

FIG. 4 illustrates an example signaling diagram for reference signal coordination, according to an embodiment. FIG. 4 depicts the possible signaling options involved for the reference signal coordination for initial discovery and building the candidate set of beams. In FIG. 4, option-1 is a proactive scheme where the RS density and/or periodicity information is sent by the 5G-NB$_a$ to 5G-NB$_b$ using 5G X2* signalling using newly defined information elements. After receiving the RS density and/or periodicity information at 5G-NB$_b$, the NB configures the RS accordingly, thereby enabling efficient discovery.

As further illustrated in FIG. 4, option-2 is a reactive scheme where the source 5G-NB informs the target NB about a potential handover (HO) after which the 5G-NB$_b$ configures dense RS for UE measurements. Once the target NB is successfully detected and candidate beams determined, the source NB exchanges the RS density information, in order to optimize the transmissions in the candidate beam set. Here, the density is dependent on a multitude of factors such as the UE speed, channel conditions, probability of non-line of sight, etc.

In an embodiment, the RS density may also depend on the Quality of Service (QoS) requirements of the service flows that the UE receives. If the UE is having service flows with high reliability and low packet loss requirements, the source 5G-NB will request the target 5G-NB to configure dense RS in order to accurately estimate the channel quality. If the UE is having only, for example, default service flows with best-effort traffic, the RS density configuration may also be optimized for maximizing the spectral efficiency of the target NB beams, irrespective of the mobility state or the speed of the UE.

In a further embodiment, a method may be used to optimize the level of discoverability of the target 5G-NB, by configuring the dense or periodic RS only if the target 5G-NB needs to be discovered. If the target 5G-NB is already fully loaded or depending on the mobility support the 5G-NB would like to provide, then the target 5G-NB can either reject a RS modification request from the source 5G-NB or inform the source 5G-NB about the load conditions or the rejection of RS modification request so that the RS modification request itself is not sent to the target 5G-NB.

According to an embodiment, idle mode UE mobility handling is assumed to have limited impacts using the proposed method by using the following enhancements: a) configure a set of 5G-NBs to be used for idle mode mobility, thereby avoiding such reference signal enhancements; b) since 5G-NBs, especially millimeter wave (mmW) cells have limited coverage footprint, assume that idle mode mobility is handled by legacy RATs such as 4G; c) use a limited set of physical resources with dense cell-specific reference signals (CRS) configuration for measurements by idle mode UEs.

Figure 5A:
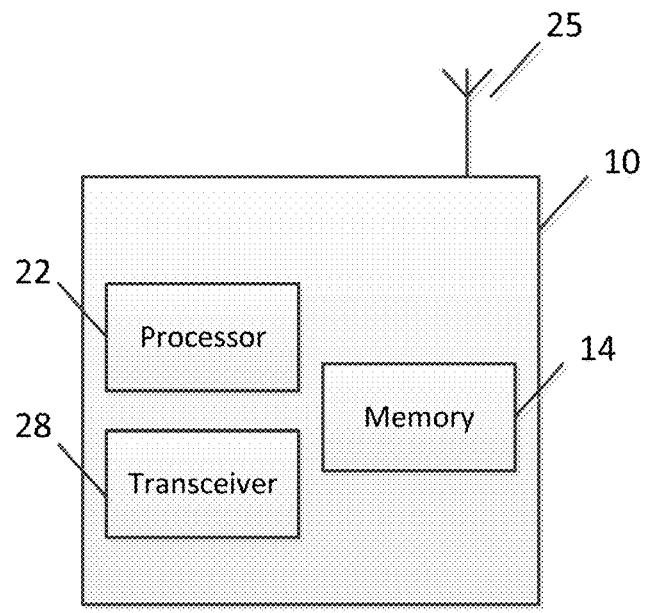
FIG. 5a illustrates an example of an apparatus, according to an embodiment.

FIG. 5a illustrates an example of an apparatus 10 according to an embodiment. In an embodiment, apparatus 10 may be a node, host, or server in a communications network or serving such a network. For example, apparatus 10 may be a network node or access node for a radio access network, such as a base station, node B or eNB, or an access node of 5G radio access technology. For example, in one embodiment, apparatus 10 may be the target base station—5G-NB$_b$—illustrated in FIG. 4 discussed above. It should be noted that one of ordinary skill in the art would understand that apparatus 10 may include components or features not shown in FIG. 5a.

As illustrated in FIG. 5a, apparatus 10 may include a processor 22 for processing information and executing instructions or operations. Processor 22 may be any type of general or specific purpose processor. While a single processor 22 is shown in FIG. 5a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station, node B, or eNB, or an access node of 5G, for example. In one embodiment, apparatus 10 may be a target base station or eNB, for example. According to one embodiment, apparatus 10 may be controlled by memory 14 and processor 22 to perform the functions associated with embodiments described herein. For instance, in one embodiment, apparatus 10 may be controlled by memory 14 and processor 22 to receive a request to begin transmitting reference signal(s) for mobility measurements. The request may be received from a source base station serving a UE, and the request may be received when a handover of the user equipment is impending. In an embodiment, it is determined that the handover of the UE is impending based on if the user equipment starts moving or when the user equipment's signal quality decreases, for example.

According to an embodiment, the mobility measurements may be used to configure reference signal periodicity and/or density. In one embodiment, apparatus 10 may be further controlled by memory 14 and processor 22 to receive reference signal density and/or periodicity information from the source base station. In this embodiment, after receiving the reference signal density and/or periodicity information, apparatus 10 may be further controlled by memory 14 and processor 22 to determine a candidate beam set to enable efficient discovery of the apparatus 10. According to one embodiment, apparatus 10 may be further controlled by memory 14 and processor 22 to decide whether or not to transmit the reference signals for mobility measurements, and to transmit the reference signals if it is decided to do so.

According to one embodiment, apparatus 10 may be controlled by memory 14 and processor 22 to receive a notification of the impending handover, determine a candidate beam set to enable efficient discovery of the apparatus 10, and, after determining the candidate beam set, to receive reference signal density information from the source base station.

In an embodiment, the reference signal density and/or periodicity may be dependent upon at least one of user equipment speed, channel conditions, probability of non-line of sight, or quality of service (QoS) requirements of service flow that the user equipment receives.

According to certain embodiments, apparatus 10 may be controlled by memory 14 and processor 22 to increase reference signal density in the candidate beam set in the apparatus for service flows serving high reliability traffic. In an embodiment, apparatus 10 may be controlled by memory 14 and processor 22 to change the reference signal density depending on mobility state alone for default service flows. For example, apparatus 10 may be controlled to reduce reference signal density and/or periodicity for slow moving user equipment, and to increase reference signal density and/or periodicity for fast moving user equipment. In an embodiment, when the apparatus 10 does not want to serve new user equipment, apparatus 10 may be controlled by memory 14 and processor 22 to reject the request from the source base station so that user equipment do not detect the target base station.

Figure 5B:
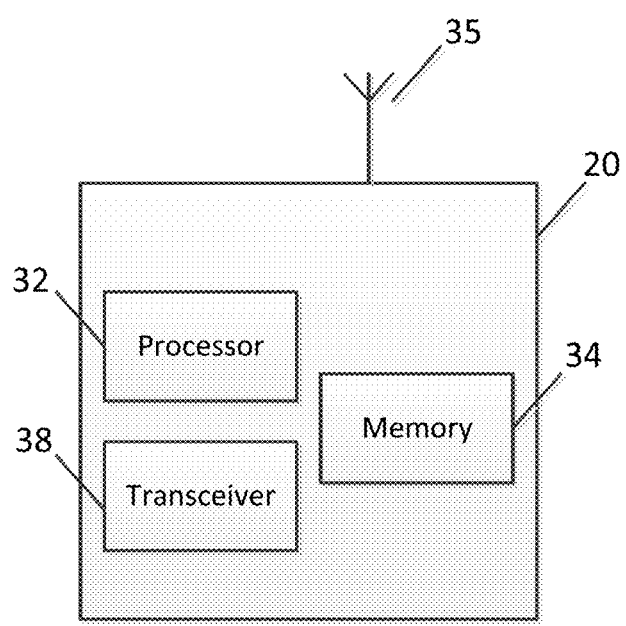
FIG. 5b illustrates an example of an apparatus, according to another embodiment.

FIG. 5b illustrates an example of an apparatus 20 according to another embodiment. In an embodiment, apparatus 20 may be may be a node, host, or server in a communications network or serving such a network. For example, apparatus 20 may be a network node or access node for a radio access network, such as a base station, node B or eNB, or an access node of 5G radio access technology. For example, in one embodiment, apparatus 20 may be the source base station—5G-$NB_a$—illustrated in FIG. 4 discussed above. It should be noted that one of ordinary skill in the art would understand that apparatus 20 may include components or features not shown in FIG. 5b.

As illustrated in FIG. 5b, apparatus 20 may include a processor 32 for processing information and executing instructions or operations. Processor 32 may be any type of general or specific purpose processor. While a single processor 32 is shown in FIG. 5b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a network node or access node, such as a base station, node B, or eNB, or an access node of 5G, for example. In one embodiment, apparatus 10 may be a source base station or eNB, for example. In this embodiment, apparatus 20 may be controlled by memory 34 and processor 32 to perform the functions associated with embodiments described herein. In one embodiment, apparatus 20 may be controlled by memory 34 and processor 32 to determine that a target base station should be informed about a need for reference signals for mobility measurements, and then to send a request to a target base station to begin transmitting reference signals for mobility measurements. In an embodiment, apparatus 20 may be controlled by memory 34 and processor 32 to determine a need for transmitting the request before sending it, for example, by determining that handover of the UE is impending based on, for instance, estimating UE movement or signal quality.

In an embodiment, the mobility measurements are used to configure reference signal periodicity and/or density. According to one embodiment, apparatus 20 may be controlled by memory 34 and processor 32 to send reference signal density and/or periodicity information to the target base station. In one embodiment, the request sent to the target base station to begin transmitting reference signals for mobility measurements may further include the reference signal density and/or periodicity information. After receiving the reference signal density and/or periodicity information, the target base station may determine a candidate beam set to enable efficient discovery of the target base station.

In another embodiment, apparatus 20 may be controlled by memory 34 and processor 32 to send, to the target base station, a notification of the impending handover of the UE. The target base station may then determine a candidate beam set to enable efficient discovery of the target base station. After the candidate beam set is determined, apparatus 20 may be controlled by memory 34 and processor 32 to send reference signal density and/or periodicity information to the target base station. In an embodiment, it may be determined that the handover of the user equipment is impending based on if the user equipment starts moving or when the user equipment's signal quality decreases.

According to certain embodiments, the reference signal density and/or periodicity may be dependent upon at least one of user equipment speed, channel conditions, probability of non-line of sight, or quality of service (QoS) requirements of service flow that the user equipment receives. In one embodiment, the reference signal density and/or periodicity may be increased in the candidate beam set in the target base station for service flows serving high reliability traffic. In another embodiment, the reference signal density and/or periodicity may be changed depending on mobility state alone for default service flows. For example, the reference signal density and/or periodicity may be reduced for slow moving user equipment, and the reference signal density and/or periodicity may be increased for fast moving user equipment.

Figure 6A:
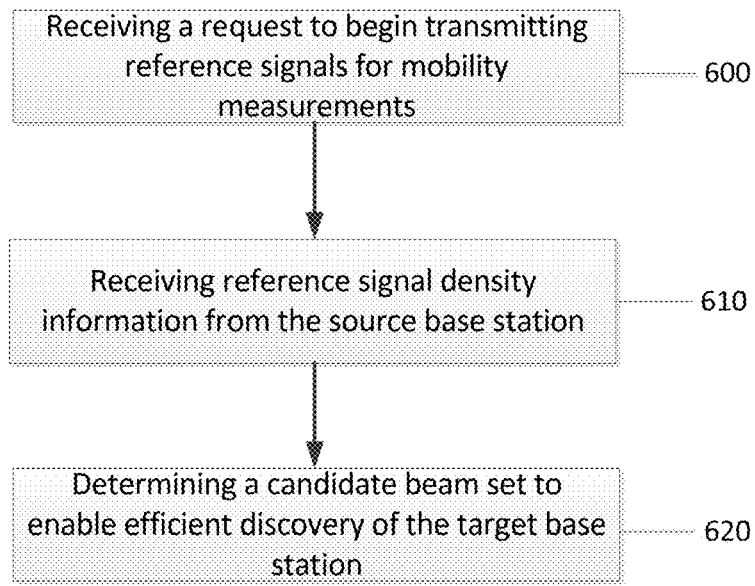
FIG. 6a illustrates an example of a flow chart for a method, according to one embodiment.

FIG. 6a illustrates an example of a flow chart for a method, according to one embodiment. In certain embodiments, the method depicted in FIG. 6a may be performed by a base station or eNB, such as a target base station, for example. As illustrated in FIG. 6a, the method may include, at 600, receiving a request to begin transmitting reference signals for mobility measurements. The request may be received from a source base station serving a UE, and the request may be received when a handover of the user equipment is impending. The method may further include, at 610, receiving reference signal density and/or periodicity information from the source base station. For example, in one embodiment, the request to begin transmitting reference signals for mobility measurements may further include the reference signal density and/or periodicity information. After receiving the reference signal density and/or periodicity information, the method may include, at 620, determining a candidate beam set to enable efficient discovery of the target base station. In one embodiment, the method may also include, in response to receiving the request, deciding whether or not to transmit the reference signals for mobility measurements and transmitting the reference signals for mobility measurements when it is decided to do so.

Figure 6B:
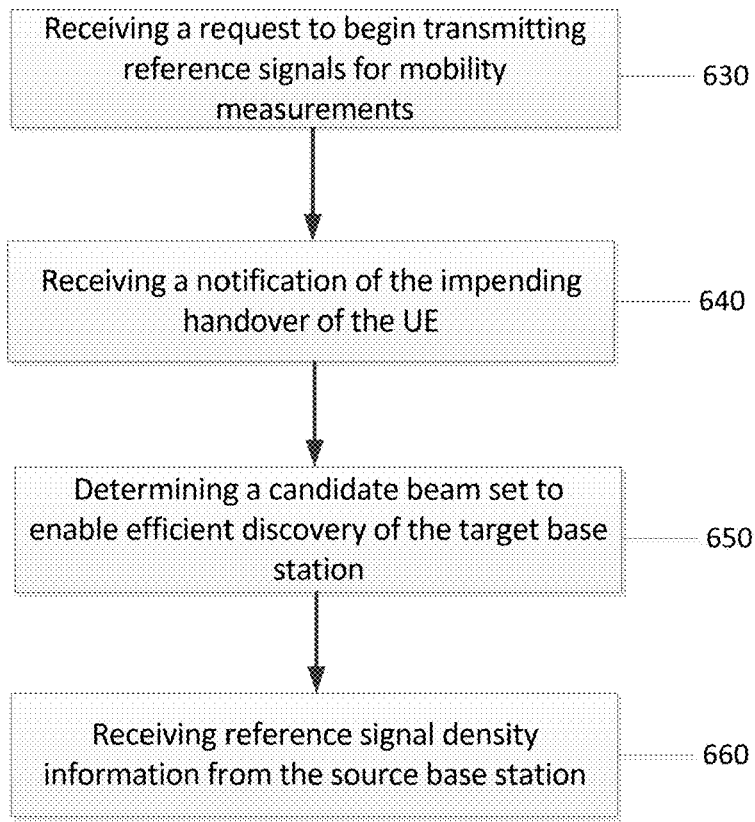
FIG. 6b illustrates an example of a flow chart for a method, according to another embodiment.

FIG. 6b illustrates an example of a flow chart for a method, according to another embodiment. In certain embodiments, the method depicted in FIG. 6b may be performed by a base station or eNB, such as a target base station, for example. As illustrated in FIG. 6b, the method may include, at 630, receiving a request to begin transmitting reference signals for mobility measurements. The request may be received from a source base station serving a UE, and the request may be received when a handover of the user equipment is impending. The method may further include, at 640, receiving a notification of the impending handover of the UE. The method may then include, at 650, determining a candidate beam set to enable efficient discovery of the target base station. After determining the candidate beam set, the method may include, at 660, receiving reference signal density and/or periodicity information from the source base station. In an embodiment, the method may also include, in response to receiving the request, deciding whether or not to transmit the reference signals for mobility measurements and transmitting the reference signals for mobility measurements when it is decided to do so.

Figure 6C:
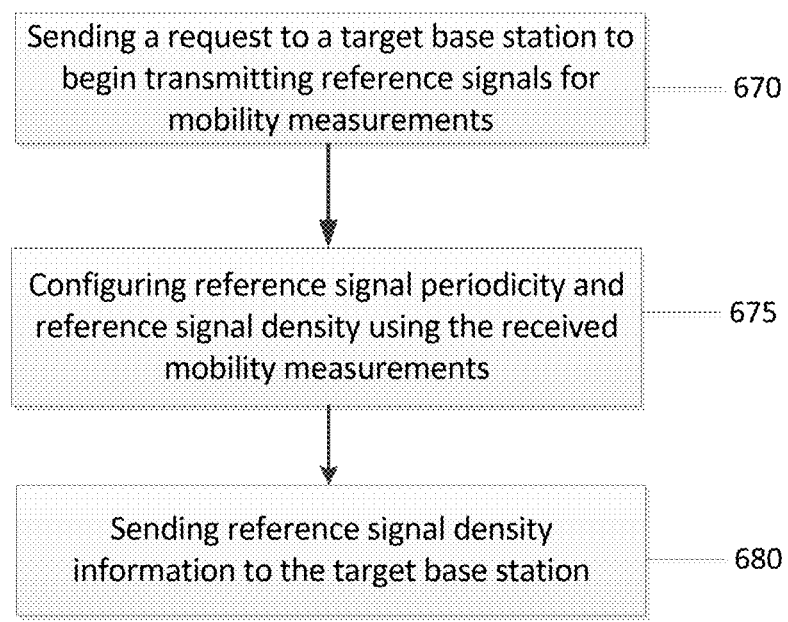
FIG. 6c illustrates an example of a flow chart for a method, according to another embodiment.

FIG. 6c illustrates an example of a flow chart for a method, according to another embodiment. In certain embodiments, the method depicted in FIG. 6c may be performed by a base station or eNB, such as a source base station, for example. As illustrated in FIG. 6c, the method may include, at 670, determining that a target base station should be informed about a need for reference signals for mobility measurements and sending a request to the target base station to begin transmitting reference signals for mobility measurements. The request may be sent when a handover of the UE is impending. In an embodiment, the method may include determining a need for transmitting the request before sending it, for example, by determining that handover of the UE is impending based on, for instance, estimating UE movement or signal quality.

In an embodiment, the method may also include, at 675, configuring reference signal periodicity and reference signal density using the received mobility measurements. According to one embodiment, the method may include, at 680, sending reference signal density and/or periodicity information to the target base station. After receiving the reference signal density and/or periodicity information, the target base station may determine a candidate beam set to enable efficient discovery of the target base station.

In another embodiment, the method may include sending, to the target base station, a notification of the impending handover of the UE. The target base station may then determine a candidate beam set to enable efficient discovery of the target base station. After the candidate beam set is determined, the method may include sending reference signal density information to the target base station. In an embodiment, it may be determined that the handover of the user equipment is impending based on if the user equipment starts moving or when the user equipment's signal quality decreases.

According to certain embodiments, the reference signal density and/or periodicity may be dependent upon at least one of user equipment speed, channel conditions, probability of non-line of sight, or quality of service (QoS) requirements of service flow that the user equipment receives. In one embodiment, the reference signal density may be increased in the candidate beam set in the target base station for service flows serving high reliability traffic. In another embodiment, the reference signal density may be changed depending on mobility state alone for default service flows. For example, the reference signal density may be reduced for slow moving user equipment, and the reference signal density may be increased for fast moving user equipment.

In an exemplary embodiment, an apparatus, such as a base station, may include means for carrying out embodiments described above and any combination thereof.

It should be noted that certain embodiments of the invention can be implemented in centralized-RAN (C-RAN) deployments as well. In such embodiments, the signalling described herein could be between two virtual machines or base stations pools within a cloud server.

Figures 7A, 7B:
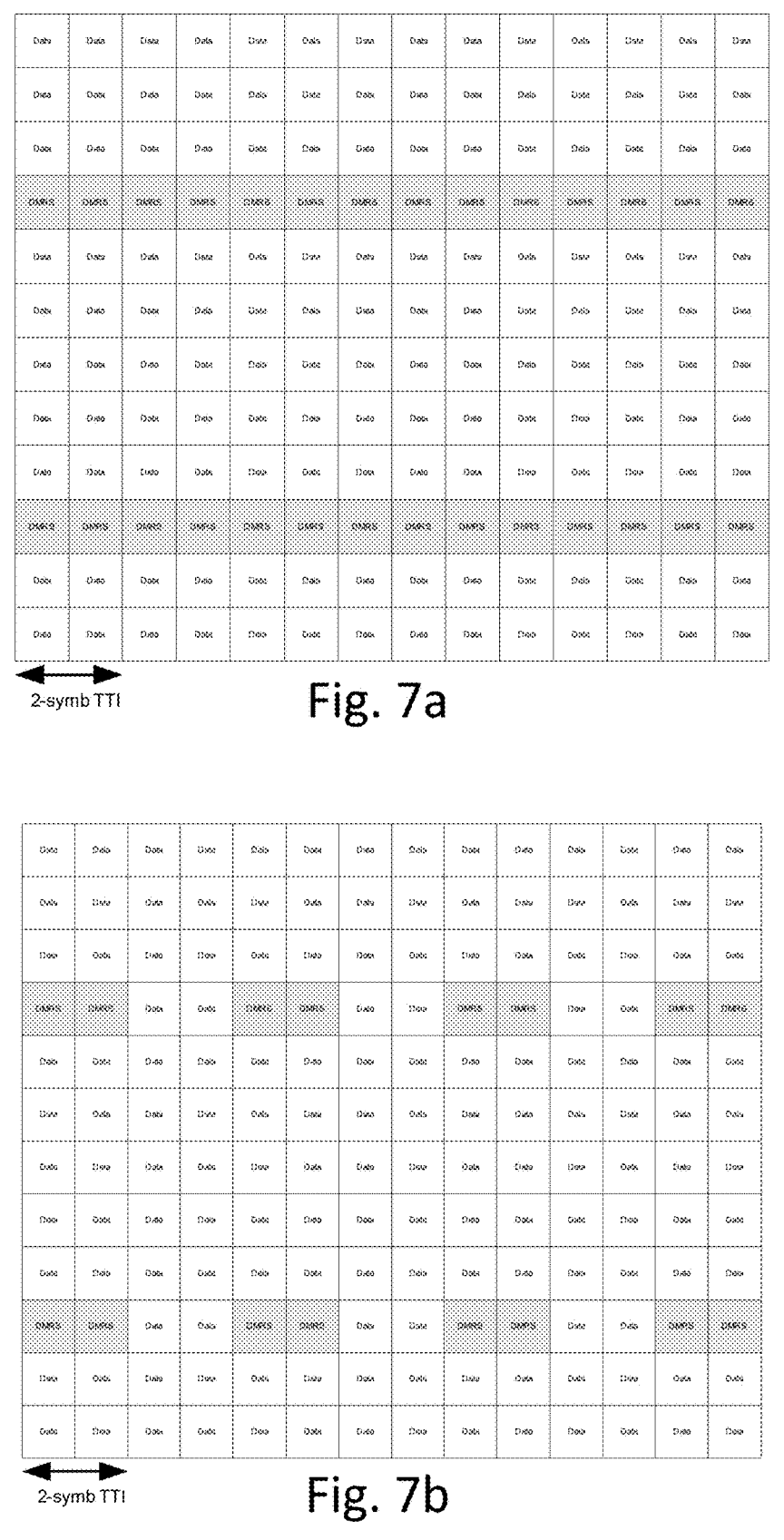

Prototyping was performed to estimate the impact of RS optimization, according to embodiments of the invention, on mobility using 4G/LTE-A link layer simulations. FIGS. 7a and 7b respectively illustrate example cases where reference signals are transmitted on every transmission time interval (TTI) and are not transmitted on every transmission time interval (TTI). The TTI considered here is two orthogonal frequency division multiplexing (OFDM) symbol with UE-specific reference signals. FIG. 7a illustrates the case with transmission of reference signals in every TTI; while FIG. 7b illustrates transmission of reference signals in every $2^{nd}$ TTI with half the overhead in comparison to baseline case.

Figure 8A:
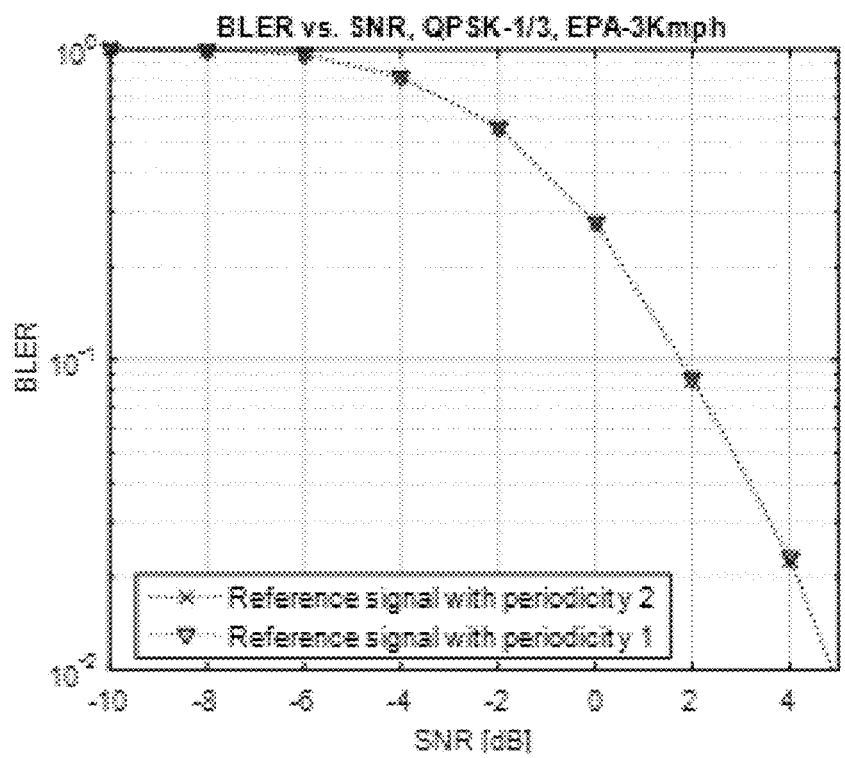
FIG. 8a illustrates an example of the performance comparison in terms of block error rate (BLER) vs. signal-to-noise ratio (SNR)
Figure 8B:
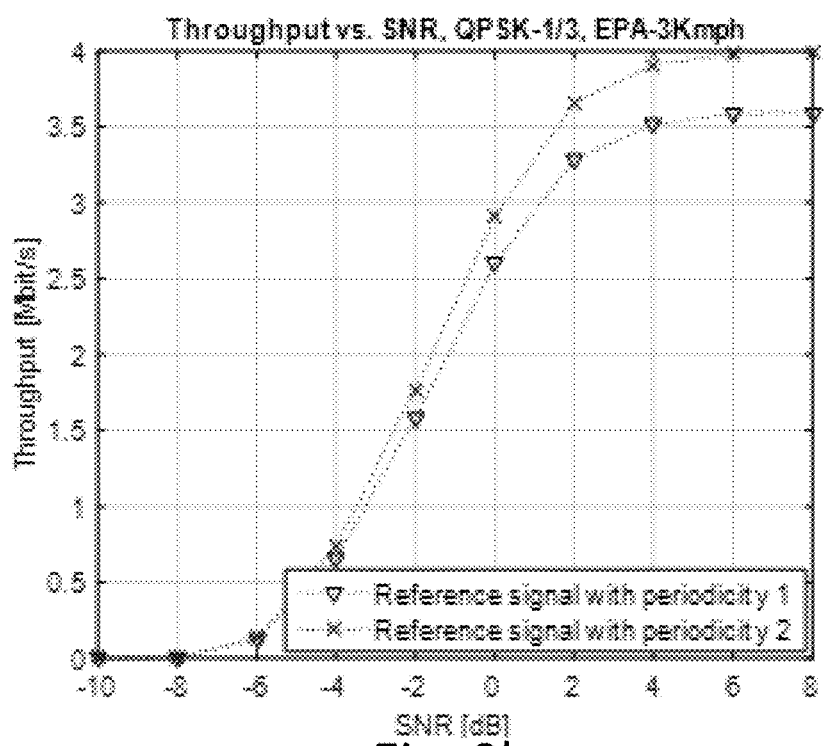
FIG. 8b illustrates an example of the performance comparison in terms of throughput vs. signal-to-noise ratio (SNR).

FIG. 8a illustrates an example of the performance comparison in terms of block error rate (BLER) vs. signal-to-noise ratio (SNR). FIG. 8b illustrates an example of the performance comparison in terms of throughput vs. signal-to-noise ratio (SNR). In both FIGS. 8a and 8b, modulation and coding scheme (MCS) quadrature phase shift keying (QPSK)-1/3 with channel 3GPP extended pedestrian A (EPA) model with 3 Kmph is used. First, from FIGS. 8a and 8b, it can be clearly observed that the BLER is almost the same for both the cases. This implies that even with increased periodicity, the channel estimation is quite robust and therefore the BLER performance remains almost same. The throughput performance becomes better with periodicity 2 since the overhead is less in this case, while maintaining almost the same BLER. Based on these example cases, it is evident that sparsely transmitting reference signals provide improvement in terms of energy efficient as well as throughput performance, especially for low speed scenarios that are relevant in 5G.

Therefore, embodiments of the invention provide several advantages and/or technical improvements. For example, the use of embodiments of the invention can result in improved throughput and optimized load balancing, thereby improving the functioning of communications networks and their nodes.

In some embodiments, the functionality of any of the methods, processes, or flow charts described herein may be implemented by software and/or computer program code or portions of it stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   receiving, by a target base station, a request to begin transmitting reference signals for mobility measurements, the request being received from a source base station serving a user equipment; and
   in response to the request, deciding whether or not to configure reference signal density and/or reference signal periodicity and transmit the reference signals for mobility measurements to the user equipment,
   wherein the receiving of the request further comprises receiving, by the target base station, at least one of reference signal density or reference signal periodicity information from the source base station.

2. The method according to claim 1, wherein the receiving comprises receiving the request when a handover of the user equipment is impending.

3. The method according to claim 1, wherein the reference signal density and/or periodicity is dependent upon at least one of user equipment speed, channel conditions, probability of non-line of sight, or quality of service (QoS) requirements of service flow that the user equipment receives.

4. The method according to claim 1, wherein the configuring further comprises:
   reducing the reference signal density and/or reference signal periodicity for user equipment moving at a speed that is below a threshold; and
   increasing the reference signal density and/or reference signal periodicity for user equipment moving at a speed that is above a threshold.

5. The method according to claim 1, wherein said deciding is based on load or mobility support that the target base station would like to provide.

6. An apparatus, comprising:
   at least one processor; and
   at least one memory including computer program code,
   wherein the at least one memory and computer program code are configured, with the at least one processor, to cause the apparatus at least to
   receive a request to begin transmitting reference signals for mobility measurements, the request being received from a source base station serving a user equipment; and
   in response to the request, decide whether or not to configure reference signal density and/or reference signal periodicity and transmit the reference signals for mobility measurements to the user equipment,
   wherein the request further comprises at least one of reference signal density or reference signal periodicity information from the source base station.

7. The apparatus according to claim 6, wherein the request is received when a handover of the user equipment is impending.

8. The apparatus according to claim 6, wherein the at least one memory and computer program code are further configured, with the at least one processor, to cause the apparatus at least to, after receiving the at least one of reference signal density or reference signal periodicity information, determine a candidate beam set to enable discovery of the apparatus.

9. The apparatus according to claim 8, wherein the at least one memory and computer program code are further configured, with the at least one processor, to cause the apparatus at least to increase the at least one of reference signal density or reference signal periodicity information in the candidate beam set in the apparatus for service flows serving traffic requiring reliability.

10. The apparatus according to claim 8, wherein the at least one memory and computer program code are further configured, with the at least one processor, to cause the apparatus at least to change the at least one of reference signal density or reference signal periodicity information depending on mobility state alone for default service flows.

11. The apparatus according to claim 6, wherein the reference signal density and/or periodicity is dependent upon at least one of user equipment speed, channel conditions, probability of non-line of sight, or quality of service (QoS) requirements of service flow that the user equipment receives.

12. The apparatus according to claim 6, wherein the at least one memory and computer program code are further configured, with the at least one processor, to cause the apparatus at least to:
   reduce the reference signal density and/or reference signal periodicity for user equipment moving at a speed below a threshold; and
   increase the reference signal density and/or reference signal periodicity for user equipment moving at a speed above a threshold.

13. The apparatus according to claim 6, wherein the at least one memory and computer program code are further configured, with the at least one processor, to cause the apparatus at least to, when the apparatus does not want to serve new user equipment, send a non-acknowledgement message to reject the request from the source base station so that user equipment do not detect the target base station.

14. The apparatus according to claim 6, wherein said deciding is based on load or mobility support that the apparatus would like to provide.

15. An apparatus, comprising:
   at least one processor; and
   at least one memory including computer program code,
   wherein the at least one memory and computer program code are configured, with the at least one processor, to cause the apparatus at least to determine that a target base station should be informed about a need for reference signals for mobility measurements; and send a request to the target base station to begin transmitting reference signals for mobility measurements to a user equipment;

wherein the apparatus comprises a source base station serving the user equipment, wherein the request further comprises at least one of reference signal density or reference signal periodicity information from the source base station.

16. The apparatus according to claim 15, wherein the at least one of reference signal density or reference signal periodicity information is also dependent upon at least one of user equipment speed, channel conditions, probability of non-line of sight, or quality of service (QoS) requirements of service flow that the user equipment receives.

17. The apparatus according to claim 15, wherein the at least one memory and computer program code are further configured, with the at least one processor, to cause the apparatus at least to send a notification, to the target base station, of a potentially impending handover of the user equipment.

18. The apparatus according to claim 15, wherein the request is sent when a handover of a user equipment is impending, and wherein it is determined that the handover of the user equipment is impending when the user equipment starts moving or when the user equipment's signal quality decreases.

19. The apparatus according to claim 15, wherein the at least one memory and computer program code are further configured, with the at least one processor, to cause the apparatus at least to receive a non-acknowledgement message, from the target base station, rejecting the request when the target base station does not wish to change reference signal configuration.

* * * * *